United States Patent [19]
Andersson

[11] Patent Number: 5,632,327
[45] Date of Patent: May 27, 1997

[54] TEMPERATURE CONTROL

[75] Inventor: Heimer Andersson, Falkenberg, Sweden

[73] Assignee: Energy Ceiling Company Limited

[21] Appl. No.: 338,445

[22] PCT Filed: Mar. 22, 1993

[86] PCT No.: PCT/GB93/00588

§ 371 Date: Feb. 16, 1995

§ 102(e) Date: Feb. 16, 1995

[87] PCT Pub. No.: WO93/19330

PCT Pub. Date: Sep. 30, 1993

[30] Foreign Application Priority Data

Mar. 20, 1992 [SE] Sweden ............................ 9200859
Feb. 24, 1993 [GB] United Kingdom ............... 9303739

[51] Int. Cl.⁶ .................................................. F24D 19/02
[52] U.S. Cl. ........................... 165/49; 165/53; 62/DIG. 1
[58] Field of Search ............................... 165/49, 166, 53, 165/904, 905; 62/DIG. 1; 361/703; 52/27

[56] References Cited

U.S. PATENT DOCUMENTS

| | | | |
|---|---|---|---|
| 4,155,887 | 5/1979 | Hetson | 524/27 |
| 4,168,740 | 9/1979 | Cairenius | 165/49 |
| 4,945,981 | 8/1990 | Joshi | 165/166 X |
| 4,993,630 | 2/1991 | Reichel et al. | 165/49 X |
| 4,997,031 | 3/1991 | Kashiwada | 165/166 X |
| 5,166,862 | 11/1992 | Durivage, III et al. | 361/703 |
| 5,228,500 | 7/1993 | Sano | 165/49 |

FOREIGN PATENT DOCUMENTS

| | | | |
|---|---|---|---|
| 778317 | 7/1957 | United Kingdom . | |
| 897749 | 5/1962 | United Kingdom | 165/49 |
| 1180607 | 2/1970 | United Kingdom . | |
| 1497261 | 1/1978 | United Kingdom . | |

OTHER PUBLICATIONS

Paint Formulation Principles and Practice; J. Boxall and J.A. von Fraunhofer 1980; pp. 151–152 and 159–160.
Chemical Plublishing Co., Inc. 1978; pp. 294–298.

*Primary Examiner*—John Rivell
*Assistant Examiner*—Christopher Atkinson
*Attorney, Agent, or Firm*—Kerkam, Stowell, Kondracki & Clarke, P.C.; Edward J. Kondracki

[57] ABSTRACT

A suspended ceiling (C) comprises one or more panels (P) containing water (W) arranged so that the water is in contact with substantially all of the lower surface (10) of the panels (P).

11 Claims, 2 Drawing Sheets

TEMPERATURE CONTROL

FIELD OF THE INVENTION

The invention relates to the temperature control of areas in buildings such as rooms in offices, hotels, retail shops, supermarkets, hospitals, and the like. In particular the invention relates to the cooling of rooms by transfer of heat from the air in the room by means of ceiling structure suspended below the top surface of the room.

BACKGROUND OF THE INVENTION

It is known to suspend a ceiling structure below the top surface of the room, the structure comprising panels incorporating pipes containing a fluid medium typically water. Heat is transferred from the hot air in the room into the pipes and extracted from the room, to keep the temperature in the room be low a predetermined limit. This system has several drawbacks.

SUMMARY OF THE INVENTION

It is one object of this invention to provide a suspended ceiling which is more efficient and advantageous in controlling the climate of a room.

In one aspect the invention provides a building including a room having a top surface, a ceiling suspended by hanger means below the top surface, the ceiling comprising one or more panels containing a fluid medium, characterised in that the fluid medium is in contact with substantially all of the lower surface of the panels whereby heat transfer occurs over substantially all of the lower surface.

Preferably the lower surface of the panels is in direct contact with the air of the room. As a result there is a direct transfer of heat from the air into the fluid medium.

Preferably the lower surface of the panels is contoured to increase the surface area thereof. This may be by suitable shaping and/or the lower surface may be covered with a paint or the like to provide a textured finish.

Preferably the panels include flow control means to distribute the fluid evenly therethrough from an inlet to an outlet. Preferably the inlet and the outlet are set at opposite sides of the panel, e.g. diagonally, or in whichever way iS efficient for making connections between the panels making up the ceiling.

The panels may be made of metal, or plastics, or plastics covered sheet metal. Preferably they are moulded of polycarbonate, PVC-u, ABS, high impact styrene or polymethylmethacrylate or any suitable plastic which is inflammable. The mechanical strength of the material forming the panel walls is selected so that the panels can support their own weight and that of the fluid medium without distortion. Preferably in the case of plastics the panels are made of a material having a tensile strength at 23° C. of about 60 MPa and a flexural strength of about 90 MPa; these values will be higher where the panels are made of metal.

The panels may have one wall made of metal for strength, e.g. a plastic coated steel sheeting. Extra layers may be present, e.g. heat insulating layers. A finish may be applied to the panels after moulding, e.g. a paint layer especially of a textured paint, as that will increase the surface area and avoid zones where there is such a temperature difference that condensation can occur.

The panels may be moulded in such a way that there is no need to use T-bars to form a ceiling grid. Thus hook means may be present on the panels and connected to the hanger means whereby the panels are suspended directly from the hanger means. Also, adjacent panels may be shaped so that the lower surface thereof provides a substantially continuous surface.

In one embodiment of the invention the ceiling constitutes the lower wall of a building services duct. In such a case an inlet for fresh air may be present in the duct and the ceiling panels of the invention are arranged to transfer heat to the incoming air from the upper surface thereof.

Preferably the fluid medium comprises water which may contain additives such as dyes, anti-freeze agents, agents against bacteria and other organisms; and the like.

In another aspect the invention provides a method of cooling a room in a building, the room containing a ceiling suspended by hanger means below the top surface of the room, the ceiling comprising one or more panels through which a fluid medium is passed characterised by contacting the fluid medium with substantially all of the lower surface of the panel.

The method preferably includes the step of locating flow control means in the panel to distribute the fluid evenly in a path from an inlet of the panel to an outlet thereof.

Most preferably the fluid medium is passed under a pressure of less than about 1 bar, particularly about 0.2 bar.

In yet another aspect the invention provides for use in a suspended ceiling, a panel formed of a plastics material and having means for the flow of fluid medium therethrough, characterised in that the panel is shaped so that, in use, the fluid medium is in contact with substantially all of the lower surface of the panel.

Preferably the panel includes means to guide the flow of the fluid medium through the panel from an inlet to an outlet.

Preferably the panel is formed of a material which has sufficient mechanical strength to support the weight of the panel and the fluid medium without distortion. Most preferably the panel includes hook means for direct connection to hanger means.

BRIEF DESCRIPTION OF THE DRAWINGS:

In order that the invention may be well understood it will now be described with reference to the accompanying diagrammatic drawings, in which.

DETAILED DESCRIPTION OF THE PREFERRED EMBODIMENTS

Figure 1:
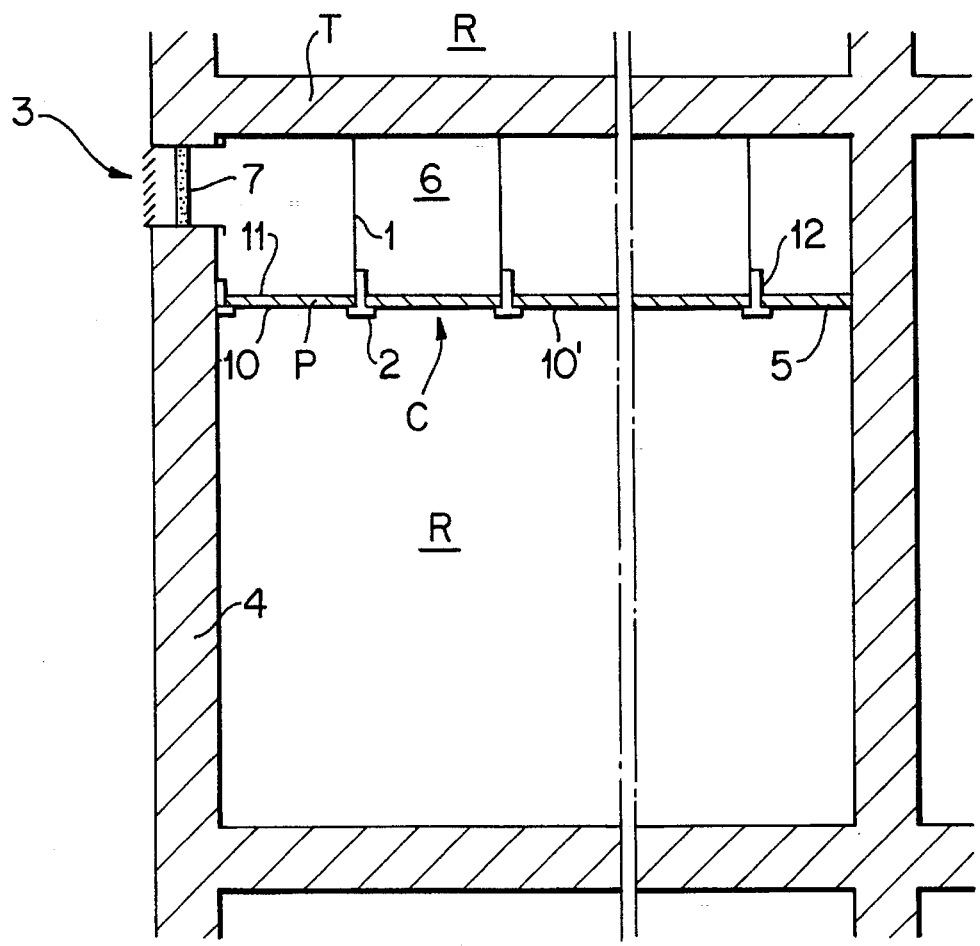
FIG. 1 is a vertical section of one room.
Figure 2:
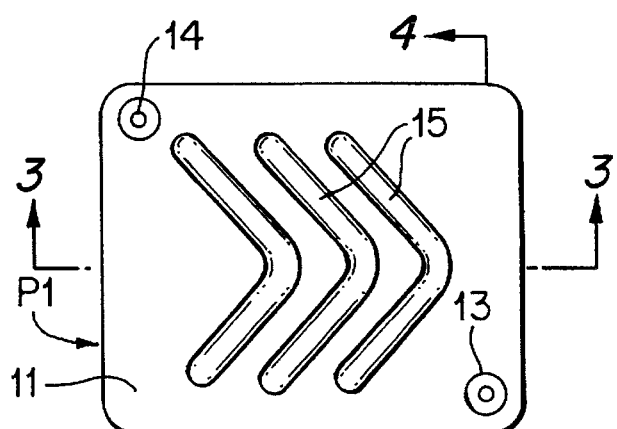
FIG. 2 a plan view of one panel of the ceiling of FIG. 1.

A room R contains a ceiling C suspended from the top surface T of the room, e.g. an overlying floor or the roof of the building.

The ceiling C is made up of panels P located in the squares of a grid frame defined by T bars 2 which are connected to hanger rods 1 secured to the top surface T of the room. The space from the surface T to the top of the ceiling 1 defines a building services space 6, which, as shown includes an inlet 3 in the outer wall 4 and contains a filter 7; at least one grid outlet 5 is present in the ceiling C to draw air from the duct 6 into the space of the room R. (The space 6 is an optional feature).

Figure 3:
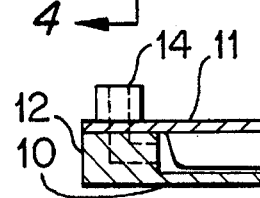
FIGS. 3 and 4 show respectively a vertical section and a transverse section through the ceiling panel of FIG. 2.
Figure 4:
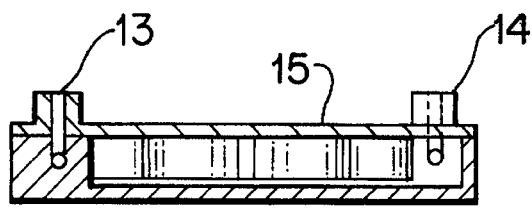
Figure 5:
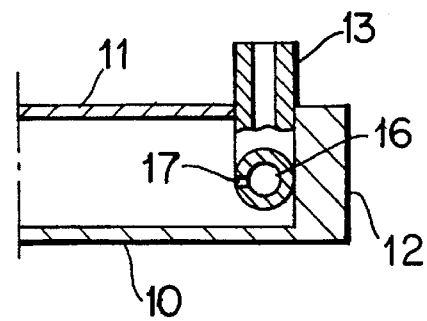
FIGS. 5 and 6 shows respectively a vertical section and a transverse section through another ceiling panel of the invention.
Figure 6:
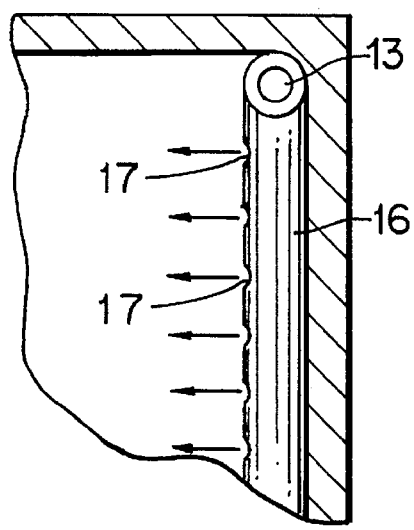

Each panel P comprises a lower wall 10 and an upper wall 11 which are sealed at their margins 12 to form a slab like structure. A fluid medium, W, typically water, is present in the panel and enters via an inlet 13 and exits via an outlet 14. The water is supplied via pipes and pumps etc. not shown. It will be clear from the shape of the panel that the water W is in contact with all of the lower surface 10 so that an effective heat transfer can take place between the heat in the air of the room R and the flowing water W. As shown in FIG. 1, the panels P are empty but as shown in the embodiments of FIG. 3 and in FIG. 5 the panels may have internal structures to guide the water flow so that it is spread evenly across the panels. Thus in the embodiment of FIGS. 3 and 4 the upper wall 12 is formed with interior baffles 15 arranged in say a herringbone pattern as seen in plan view, to cause the water W to spread evenly thinly over the lower surface 10. A finish may be applied to the panels after molding, e.g. a paint layer especially of a textured paint 10', as that will increase the surface area and avoid zones where there is such a temperature difference that condensation can occur. In the embodiment of FIGS. 5 and 6 the inlet is set at one end of a pipe 16 the longer side of which has perforations 17 to release small diameter parallel streams. As a result of these structures the heat transfer from air to water is very efficient, and there is little or no heat difference across the panel.

Figure 7:
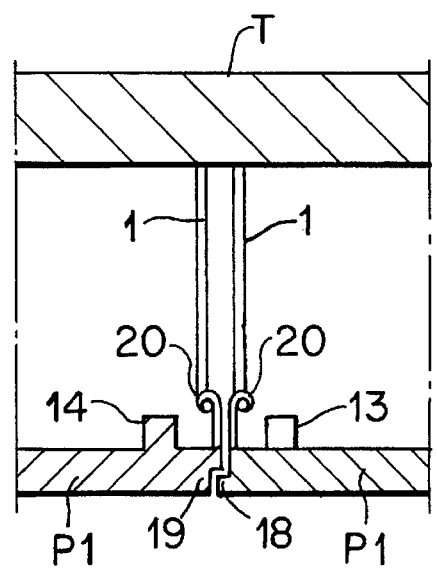
FIG. 7 is a partial elevation of two panels of the invention.

In the embodiment of FIG. 7, there are two panels P1, which at one end, the left hand end, as shown, have a projecting ledge or shoulder 18 and at the other a recess 19, dimensioned so that they can be abutted and present a continuous appearance. The top wall 11 has an end upper hook 20 which engages the end of a hanger rod 1. As a result of this arrangement the T bars 2 and the ceiling grid can be avoided, which saves a substantial proportion of the installation materials and time otherwise required.

A panel of the invention preferably has a thickness from about 6 mm to about 12 mm. The structure is made of material which has mechanical strength so that it can support its own weight and the weight of the water and is shaped so that substantially all of the top and bottom surfaces are exposed to air to provide heat transfer. Typically 80% or more of the energy transfer is by heat radiation and 20% or less by heat convention. Typically the water in a panel is at a pressure of 1 bar or less, preferably of about 0.2 bar, (which is much less than the pressurised water in say a floor or wall mounted central heating system). In the case of a plastics panel of the invention the energy transfer ranges from about 60 to about 150 W/m$^2$. The air is relatively still and not dried out.

The heat in the water W may be extracted for use (or storage) in a suitable medium. It may however be used to heat air, e.g. incoming air in the duct 6.

Because the invention works by extracting heat from a room without causing extraction of the moisture at the same time, it provides an efficient method of controlling indoor climates without affecting the humidity. Because there is no need for much air replacement it is particularly suitable for sterile areas, e.g. hospital operating theatres. The apparatus is silent in use and environmentally acceptable.

The invention is not limited to the embodiment shown. For example the panels can be moulded to the shape of the room and need not be rectangular as seen in plan.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

I claim:

1. A building, comprising a room having a top surface, a ceiling suspended by hanger means below said top surface, said ceiling including at least one panel through which a fluid medium flows, wherein said panel has a lower surface and said fluid medium is in contact with said lower surface to enable heat transfer to occur over substantially all of said lower surface, and further wherein a textured paint finish is present on said lower surface of said panel to increase the surface area thereof and to avoid zones thereon where there is such a temperature difference that condensation can occur.

2. A building according to claim 1, wherein said lower surface of the panel is contoured to increase the surface area thereof.

3. A building according to claim 1, wherein the panel is received in a grid frame formed by T-bars to which said hanger means are connected.

4. A building according to claim 1, wherein hook means are present on the panel, said hook means being connected to the hanger means to suspend the panel directly from the hanger means.

5. A building according to claim 1, wherein said ceiling constitutes a lower wall of a building services duct.

6. A building according to claim 5, including an inlet for enabling incoming fresh air to enter the duct, wherein the ceiling panel is arranged to transfer heat from an upper surface of the panel to said fresh air.

7. A method of cooling a room in a building, the room including a ceiling suspended by hanger means below a top surface of the room, the ceiling having panels through which a fluid medium is passed, a textured paint finish being present on a lower surface of the panels, said method comprising the step of causing the fluid medium to contact the lower surface of the panels for cooling the room and providing substantially no temperature difference across the lower surface of the panels so that condensation thereon is avoided.

8. A method according to claim 7, further including passing the fluid medium through said panels under a pressure of less than about 1 bar.

9. A method according to claim 8, further including passing the fluid medium through said panels at a pressure of about 0.2 bar.

10. A panel for use in a suspended ceiling, said panel being formed of a plastic material and comprising means for enabling a fluid medium to flow therethrough, said panel having a shape which enables the fluid medium to contact a lower surface of the panel, said panel further including a textured paint finish on the lower surface of the panel to increase surface area thereof and avoid zones where there is such a temperature difference that condensation can occur.

11. A panel according to claim 10, further including hook means for enabling direct connection of said panel to hanger means for suspending said panel.

* * * * *